United States Patent [19]

Mills

[11] 4,076,689

[45] Feb. 28, 1978

[54] ULTRAVIOLET LIGHT STABILIZER COMBINATION FOR POLYMERS

[75] Inventor: Kenneth R. Mills, Bartlesville, Okla.

[73] Assignee: Phillips Petroleum Company, Bartlesville, Okla.

[21] Appl. No.: 686,967

[22] Filed: May 14, 1976

[51] Int. Cl.$^2$ ................................................. C08K 5/53
[52] U.S. Cl. ...................... 260/45.75 W; 252/400 A; 260/45.85 B; 260/45.75 N
[58] Field of Search ................ 260/45.75 W, 45.75 N, 260/45.85 B; 252/400 A

[56] References Cited

U.S. PATENT DOCUMENTS

| | | | |
|---|---|---|---|
| 3,310,575 | 3/1967 | Spivack | 260/45.75 |
| 3,376,250 | 4/1968 | Newland et al. | 260/45.75 |
| 3,793,290 | 2/1974 | Dix et al. | 260/45.75 |
| 3,843,595 | 10/1974 | Mathis et al. | 260/45.75 |

OTHER PUBLICATIONS

Chemistry & Industry – Feb. 16, 1963, pp. 271 to 281.

*Primary Examiner*—V. P. Hoke

[57] ABSTRACT

Ultraviolet light stabilizer combinations for polymeric materials are provided by mixing zinc oxide, a zinc dihydrocarbyldithiocarbamate and a nickel compound selected from the group consisting of nickel dikydrocarbyldithiocarbamate, a nickel phosphonte and a nickel amine complex of 2,2'-thio-bis(p-alkylphenol). Also provided are stabilized polymeric compositions comprising solid polymers of 1-olefins and the above stabilizer combinations.

12 Claims, No Drawings

ULTRAVIOLET LIGHT STABILIZER COMBINATION FOR POLYMERS

This invention relates to combinations of ultraviolet light stabilizers and to polymeric compositions containing such combinations.

Polymers of mono-1-olefins, e.g., polyethylene, polypropylene, and the like, have physical and chemical properties which make them highly desirable for conversion into filaments and other shaped structures. It is known, however, that polymers of mono-1-olefins undergo degradation on exposure to actinic radiation. This results in a consequent loss of several of their desirable physical and chemical properties. Polypropylene is particularly susceptible to such degradation. It is also known that such polymers are commonly subjected to elevated temperatures in the course of their processing into useful articles of commerce. Processing methods such as thermoforming, injection molding, extrusion, and the like, at elevated temperatures can result in oxidative degradation of the polymer. Additionally, some uses of the poly-1-olefins, for example in electrical insulation and the like, often expose the poly-1-olefin to elevated temperatures.

To overcome the above-described problems with the processing of such polymers into useful articles of commerce, and the subsequent use of such articles, various stabilizing agents comprising ultraviolet absorbers, antioxidants, processing aids, etc., have been proposed in the prior art for incorporation into the polymer. Thus, much effort has been devoted to determining agents which can be added to such polymers to stabilize same against the degradation which is induced by exposure to light or other weathering conditions.

It is an object of the present invention to provide an ultraviolet light stabilizer combination for polymeric materials.

Another object of this invention is to provide ultraviolet light stabilized polymeric compositions.

Other aspects, objects and the several advantages of the invention will be apparent to those skilled in the art from the description and the appended claims.

In accordance with the present invention, there is provided an ultraviolet light stabilizer combination for polymeric materials comprising: (a) zinc oxide; (b) a zinc dihydrocarbyldithiocarbamate; and (c) a nickel compound selected from the group consisting of a nickel dihydrocarbyldithiocarbamate, a nickel phosphonate and a nickel amine complex of 2,2'-thiobis(p-alkylphenol). Also provided is an ultraviolet light stable polymer composition containing the above stabilizer combination.

Component (a), the zinc oxide, is well known as a pigmenting additive. In general, it is a finely divided solid having a particle size ranging from about 0.025 to about 0.93 microns.

Component (b), the zinc dihydrocarbyldithiocarbamate, can be represented by the formula

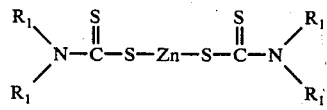

wherein each $R_1$ group independently represents an acyclic hydrocarbon radical having from 1 to 20 carbon atoms or a cyclic hydrocarbon radical having from 5 to 20 carbon atoms. Particularly preferred acyclic and cyclic radicals are aliphatic, alicyclic and aromatic hydrocarbon radicals, and combinations thereof, having up to 10 carbon atoms.

Examples of useful zinc dihydrocarbyldithiocarbamates include:
zinc dimethyldithiocarbamate,
zinc dibutyldithiocarbamate,
zinc diethyldithiocarbamate,
zinc dicyclopentyldithiocarbamate,
zinc dibenzyldithiocarbamate,
zinc dinaphthyldithiocarbamate,
zinc dieicosyldithiocarbamate,
zinc diphenyldithiocarbamate and the like.

Component (c), the nickel compound, is selected from the group consisting of a nickel dihydrocarbyldithiocarbamate, a nickel phosphonate and a nickel amine complex of 2,2'-thiobis(p-alkylphenol).

The nickel dihydrocarbyldithiocarbamate can be represented by the formula

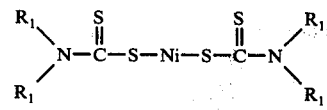

wherein $R_1$ is as defined above.

Examples of suitable nickel dihydrocarbyldithiocarbamates include:
nickel dimethyldithiocarbamate,
nickel dieicosyldithiocarbamate,
nickel dibutyldithiocarbamate,
nickel dicyclopentyldithiocarbamate,
nickel diethyldithiocarbamate,
nickel diphenyldithiocarbamate,
nickel dinaphthyldithiocarbamate and the like.

The nickel phosphonate can be represented by the formula:

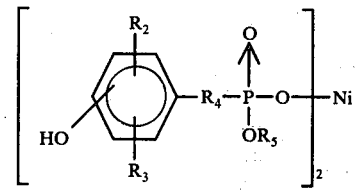

wherein $R_2$ is an alkyl radical having from 1 to 6 carbon atoms, $R_3$ is selected from the group consisting of hydrogen and alkyl having from 1 to 6 carbon atoms, $R_4$ is a divalent alkylene radical having from 1 to 4 carbon atoms and $R_5$ is selected from the group consisting of hydrogen and alkyl having from 1 to 30 atoms.

Examples of useful nickel phosphonates include:
nickel bis(O-ethyl-3,5-di-t-butyl-4-hydroxybenzylphosphonate),
nickel bis(O-n-octadecyl-3,5-di-t-butyl-4-hydroxybenzylphosphonate), and
nickel bis(O-triacontyl-3,5-di-t-butyl-4-hydroxybenzylphosphonate).

The nickel amine complexes which can be used in the practice of this invention are the nickel amine complexes of 2,2'-thiobis(p-alkylphenols). These complexes are not mixtures of amine and nickel thiobisphenols, but are discrete nickel amine complexes having amine and nickel thiobis-phenol components in a fixed ratio of 1:1 and are characterized by a single nitrogen-to-nickel coordinate bond and a single nickel-to-sulfur coordinate bond for each nickel atom in the complex molecule. They can be prepared by heating a nickel complex of 2,2'-thiobis(p-alkylphenol) wherein the alkyl radical can be a cyclic or an open chain moiety, preferably as the 1:1 aquo complex, with the amine in an inert, volatile organic solvent, preferably a non-polar solvent such as benzene, chloroform, diethylether or acetone. By removal of the solvent, the substantially pure solid amine complex is obtained. The 2,2'-thiobis(p-alkylphenols) are well known compounds and can easily be prepared by known means, such as reaction of a p-alkylphenol with $SCl_2$.

The 1:1 aquo complexes are prepared by reacting a nickel salt with a 2,2'-thiobis(p-alkylphenol) in an aqueous alcoholic medium in the presence of an acid binder such as sodium acetate.

Examples of useful p-alkylphenol sulfides include:
bis(p-octylphenol)sulfide,
bis(p-butylphenol)sulfide,
bis(p-cyclohexylphenol)sulfide,
bis(p-nonylphenol)sulfide,
bis(p-ethylphenol)sulfide,
bis(p-amylphenol)sulfide,
bis(p-t-dodecylphenol)sulfide, and
bis(p-octadecylphenol)sulfide.

Examples of amines which can be used to form the amine complexes are: ammonia, primary aliphatic amines such as methylamine, ethylamine, propylamine, butylamine, amylamine, octylamine and octadecylamine; primary aromatic amines such as aniline, anisidine, toluidine, 1-naphthylamine, 2-naphthylamine, p-dodecylaniline, p-butylaniline, xylidene, and p-octyloxyaniline; hydroxyamines such as triethanolamine and cyclohexyldiethanolamine; and cyclic secondary amines such as morpholine, hexamethyleneimine, piperazine, and piperidine. Further details regarding preparation of the above nickel amine complexes can be found in U.S. Pat. No. 3,313,770 issued Apr. 11, 1967 to H. M. Foster.

Examples of suitable nickel amine complexes for use in the present invention include:
[2,2'-thiobis(4-t-octylphenolato)]-n-butylamine-Nickel II,
[2,2'-thiobis(4-t-octylphenolato)]-n-dodecylamine-Nickel II,
[2,2'-thiobis(4-n-octadecylphenolato)]-morpholine-Nickel II,
[2,2'-thiobis(4-cyclohexylphenolato)]-1-naphthylamine-Nickel II,
[2,2'-thiobis(4-t-butylphenolato)]-hexamethyleneimine-Nickel II,
[2,2'-thiobis(4-ethylphenolato)]-n-octylamine-Nickel II,
[2,2'-thiobis(4-t-octylphenolato)]-triethanolamine-Nickel II, and
[2,2'-thiobis(4-t-octylphenolato)]-cyclohexyldiethanolamine-Nickel II.

The polymeric materials that can be employed in the practice of this invention are normally solid polymers derived from unsaturated monomers including homopolymers, copolymers, blends of a variety of at least two polymers selected from homopolymers and copolymers including polymers of aliphatic 1-olefin (polyolefins); poly(vinyl-substituted aromatic compounds) such as polystyrene; poly(vinyl halides) such as poly(vinyl chloride); and the like. Such polymers are advantageously stabilized by the use of the above-described stabilizer combination. Preferred polymers in the practice of this invention include homopolymers and copolymers derived from mono-1-olefins having from 2 to 8 carbon atoms. In most instances, the presently preferred polymers are ethylene or propylene homopolymers, or are copolymers of ethylene or propylene with minor amounts of another monomer copolymerizable therewith such as propylene or ethylene, 1-butene, 1-hexene, 1-octene, and the like. Polymers wherein at least 50 mole percent is derived from polymerization of ethylene or propylene monomeric units are preferred. Even more preferred are polymeric materials wherein at least 90 mole percent of the polymer is derived from ethylene or propylene monomer units.

The stabilizer components set out hereinbefore can be incorporated in polymers in any suitable manner. In general, each component is incorporated in a small but effective amount sufficient to impart to the polymer the desired degree of stabilization against the deteriorative action of ultraviolet light. Component (a), the zinc oxide, can be used in amounts ranging from about 0.25 to about 10 php (parts by weight per 100 parts by weight of the polymer to be stabilized), preferably from about 0.5 to about 4 php. Component (b), the zinc dihydrocarbyldithiocarbamate, can be used in an approximate amount ranging from 0.05 to 2 php, preferably about 0.1 to 1.6 php. Component (c), the nickel compound, can be used in an approximate amount ranging from 0.05 to 1.5 php, preferably about 0.08 to 1 php. The weight ratio of the respective components with respect to each other can vary over a wide range. In general, the weight ratio of zinc oxide to the zinc dihydrocarbyldithiocarbamate is in the approximate range of 200:1 to 1:8, preferably in the approximate range of 40:1 to 1:3.2 more preferably, about 10:1 to 1:32; and the weight ratio of the zinc oxide to the nickel compound is in the approximate range of 200:1 to 1:6, preferably in the approximate range of 50:1 to 1:2 more preferably about 10:1 to 1:2.

It is generally advantageous to incorporate in the polymer an antioxidant in a small but effective amount which is sufficient to stabilize the polymer composition against oxidative deteriorative action. -hydroxyhydrocinnamate)]

Such antioxidant can, generally speaking, be any suitable antioxidant known to the art to be effective for stabilizing polymers, particularly polymers of mono-1-olefins, against oxidative deteriorative action. The known compound tetrakis[methylene(3,5-di-t-butyl-4-hydroxyhydrocinamate)]methane is a presently preferred antioxidant. Generally speaking, similar hindered phenols are suitable for use in the practice of the invention. Examples of other antioxidants include, among others, the following:
2,6-di-t-butyl-4-methylphenol and related 2,4,6-polyalkylated phenols having from 15 to 30 carbon atoms per molecule,
di-n-octadecyl(3,5-di-t-butyl-4-hydroxybenzyl)phosphonate,
octadecyl[3-(3,5-di-t-butyl-4-hydroxyphenyl)]-propionate,
tris(3,5-di-t-butyl-4-hydroxybenzyl)isocyanurate, and
1,3,5-trimethyl-2,4,6-tris(3,5-di-t-butyl-4-hydroxybenzyl)benzene.

The antioxidant can be admixed with the above-described stabilizer combination, or it can be separately incorporated in the polymer. In general, the antioxidant is used in an approximate amount ranging from 0.02 to 0.5 php, preferably about 0.05 to 0.2 php. When admixed with the stabilizer combination, the weight ratio of the zinc oxide to the antioxidant is in the approximate range of 500:1 to 1:2, preferably about 80:1 to 2.5:1.

The above-described components (a) to (c) and the antioxidant, can be incorporated in the polymer in any suitable manner known in the art. The additive components can be mixed with the polymer individually or in combination as a separate mixture from the polymer using any conventional manner known in the art. It is desired that the additive components be intimately dispersed in the polymer. Suitable mixing procedures include dry mixing the various components, making solutions of one or more of the additive components and blending the resulting solutions with the polymer, melt blending the various components individually with melted polymer at temperatures that are not significantly deleterious to the polymer or the various components and the like.

The stabilized polymeric compositions of this invention can contain additional suitable additives so long as such additional additives are compatible with the polymer and so long as the improved results of this invention are unaffected. For example, additional conventional stabilizers against thermal, ultraviolet, or other degrading effects can be used as well as fillers, pigments, dyes, lubricating or processing additives such as calcium stearate, metal deactivators such as dioctyl phosphite and related compounds, and the like, can be incorporated in the polymer.

The following examples illustrate the invention:

EXAMPLE I

A series of runs was made in which polymer compositions were prepared using a polypropylene having a melt flow of 3.6 (ASTM D1238-65T, Condition L) and a crystalline melt point of 340° F (171° C). The sample compositions were prepared by mixing 0.1 php tetrakis[methylene-(3,5-di-t-butyl-4-hydroxyhydrocinnamate)]methane and one or more of the components of the stabilizing system to the polymer, as shown in Table I, below. The resulting mixtures were blended for 10 minutes at 185° C under nitrogen at 50 rpm in a Brabender Plastograph. The blended compositions were compression molded into 20 mil (0.05 cm) thick film from which specimens measuring 1¾ inches × ⅜ inch (4.4 cm × 0.9 cm) were cut. The film specimens were mounted in a fluorescent blacklight/sunlamp (BL/SL) apparatus similar to that described in Plastics Technology, May 1965, pages 34–36. Each film specimen was manually flexed to about 90° daily. Failure time was recorded as the average time, in hours, required for 5 specimens of each stabilized blend to break. The results are given in the following table:

Table I

| Run No. | ZnO[a] | BTZ[b] | EHPN[c] | DOPI[d] | Failure Time (hours) |
|---|---|---|---|---|---|
| 1 | 0.5 | 0 | 0 | 0 | 343 |
| 2 | 3.0 | 0 | 0 | 0 | 1,600 |
| 3 | 10.0 | 0 | 0 | 0 | 1,750 |
| 4 | 3.0 | 1.5 | 0 | 0 | 6,083 |
| 5 | 0 | 0 | 0.5 | 0 | 529 |
| 6 | 3.0 | 1.5 | 0.5 | 0 | 20,800+[e] |
| 7 | 3.0 | 1.5 | 0 | 0.1 | 9,700 |
| 8 | 3.0 | 1.5 | 0.5 | 0.1 | 20,800+[e] |

[a] Zinc oxide. Lead-free pigment grade; particle size, 0.13 microns; surface area, 8.0 square meters per gram.
[b] Zinc dibutyldithiocarbamate.
[c] Nickel bis(O-ethyl-3,5-di-t-butyl-4-hydroxybenzyl-phosphonate).
[d] Dioctyl phosphite.
[e] Test terminated. Specimens were still unbroken.

The above results (runs 1–3) indicate that the stabilizing action of zinc oxide levels out at about 3 php. Run 4 shows that 3.0 php ZnO and 1.5 php BTZ in admixture with the polypropylene provides effective protection to an elapsed time of 6,083 hours. This increase in protection, though substantial, is not unexpected since the combination of zinc dialkyldithiocarbamate with zinc oxide is known in the art. However, as shown by run 6, the addition of 0.5 php EHPN together with 3 php ZnO and 1.5 php BTZ to polypropylene provides an unexpected and very substantial increase in protection. Such increased protection was unexpected since, from runs 4 and 5, it would be expected that the EHPN would contribute no more than about 500 hours additional protection to the results of run 4, for a total of about 6,600 hours. At the time run 6 was terminated, the inventive combination of ZnO, BTZ and EHPN had provided more than three times the protection that would have been expected based on the combined results of runs 4 and 5.

Run 7 shows that the stabilizing action of ZnO and BTZ is increased by the addition of DOPI to the composition of run 4. As shown by run 8, the results of the addition of DOPI to the composition of run 6 are inconclusive because the testing was terminated at 20,800 hours. It can be seen, however, that the protection afforded by the polymer by the combination of ZnO, BTZ and EHPN was not hindered by the addition of DOPI thereto.

EXAMPLE II

Another series of runs was made in the manner set forth in Example I, using the same polypropylene. The stabilizers used, amounts thereof and the results obtained are presented in Table II. Film specimens of each sample composition were exposed in a Xenon lamp Weatherometer in addition to the blacklight/sunlamp (Bl/SL) apparatus used in Example I. Runs 1–5 are control runs; runs 6–11 are inventive runs.

Table II

| Run No. | ZnO[a] | BTZ[b] | ETZ[f] | EHPH[c] | BTN[g] | Complex[h] | AO-1[i] | AO-2[j] | Failure Time, Hours BL/SL | Xenon |
|---|---|---|---|---|---|---|---|---|---|---|
| 1 | 0 | 0 | 0 | 0 | 0 | 0 | 0.1 | 0 | 232 | 715 |
| 2 | 0 | 0 | 0 | 0.1 | 0 | 0 | 0.1 | 0 | 232 | 1240 |
| 3 | 0 | 0.25 | 0 | 0.1 | 0 | 0 | 0.1 | 0 | 732 | 3315 |
| 4 | 0.5 | 0.25 | 0 | 0 | 0 | 0 | 0.1 | 0 | 1426 | 2333 |
| 5 | 0.5 | 0 | 0 | 0.1 | 0 | 0 | 0.1 | 0 | 1426 | 3315 |
| 6 | 0.5 | 0.25 | 0 | 0.1 | 0 | 0 | 0.1 | 0 | 3930 | 7500+[k] |
| 7 | 0.5 | 0.25 | 0 | 0.1 | 0 | 0 | 0 | 0.1 | 4181 | 3626 |
| 8 | 0.5 | 0 | 0.25 | 0.1 | 0 | 0 | 0.1 | 0 | 4695 | 5266 |
| 9 | 0.5 | 0.25 | 0 | 0 | 0.1 | 0 | 0.1 | 0 | 5071+[k] | 5222 |
| 10 | 0.5 | 0.25 | 0 | 0 | 0 | 0.1 | 0.1 | 0 | 4695 | 7524 |

Table II-continued

| Run No. | Stabilizer Components (php) | | | | | | | | Failure Time, Hours | |
|---|---|---|---|---|---|---|---|---|---|---|
| | ZnO[a] | BTZ[b] | ETZ[f] | EHPH[c] | BTN[g] | Complex[h] | AO-1[i] | AO-2[j] | BL/SL | Xenon |
| 11 | 0.5 | 0.25 | 0 | 0.1 | 0 | 0 | 0 | 0 | 4619 | 5212 |

[a-c]See Table I
[f]Zinc diethyldithiocarbamate.
[g]Nickel dibutyldithiocarbamate.
[h][2,2'-thiobis(4-t-octylphenolato)]-n-butylamine-Nickel II.
[i]Tetrakis[methylene(3,5-di-t-butyl-4-hydroxyhydrocinnamate)].
[j]1,3,5-trimethyl-2,4,6-tris(3,5-di-t-butyl-4-hydroxybenzyl)benzene.
[k]Test continuing.

Inspection of the BL/SL results shows in runs 1 and 2 that polypropylene films containing 0.1 php antioxidant of 0.1 php each of the antioxidant and the nickel phosphonate (EHPN) have about the same resistance, namely 232 hours, before failure occurs. The failure time can be extended to 732 hours by adding the zinc dialkyldithiocarbamate (BTZ) of the invention to the system containing the nickel phosphonate as run 3 shows. The failure time can be approximately doubled to 1426 hours by including 0.5 php zinc oxide with 0.25 php BTZ or 0.1 php EHPN and the antioxidant as runs 4 and 5 demonstrate. However, the combination in runs 6 and 7 consisting of antioxidant, ZnO, BTZ and EHPN shows the unexpected results obtained by using the stabilizer system of this invention. Run 8 shows that ETZ can be substituted for BTZ. Run 9 shows that BTN can be substituted for EHPN. Run 10 shows that the nickel complex can be used in place of EHPN and good results also occur. Run 11 shows that the antioxidant can be omitted from the formulation and good results will occur as far as UV resistance is concerned. Such a formulation may not exhibit good heat stability in a sustained environment at 100° to 150° C, however, in the absence of an antioxidant.

The BL/SL results thus show that polypropylene films containing an antioxidant (preferably), zinc oxide, a zinc dialkyldithiocarbamate and a nickel compound selected from the group represented by a nickel phosphonate (EHPN), a nickel dialkyldithiocarbamate (BTN) and a nickel amine complex of 2,2'-thiobis(p-t-octylphenol) have good UV resistance.

The Xenon weatherometer data show differences but generally, except for invention run 7, are consistent with the BL/SL data. In this test device, the results of run 7 are marginally better, however, than the control runs.

The differences in results obtained by each test device are thought to be related to the wavelengths of light emitted by each device. The BL/SL device emits the greatest amount of energy below about 370 millimicrons (370 nm), particularly from about 285 to 370 nm, and relatively small amounts of energy above 370 nm. The Xenon test device used in contrast emits light ranging from about 300 to 1150 nm and particularly from about 325 to about 750 nm. The BL/SL device thus concentrates emitted light in the UV spectrum whereas the Xenon device emits light over a broad range including UV and visible light.

Reasonable variations and modifications, which will be apparent to those skilled in the art, can be made in this invention without departing from the spirit and scope thereof.

What is claimed is:
1. A composition which comprises a mixture of
   a. zinc oxide,
   b. at least one zinc dihydrocarbyldithiocarbamate represented by the formula

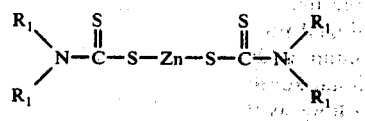

wherein each $R_1$ group is independently selected from the group consisting of an acyclic hydrocarbon radical having from 1 to 20 carbon atoms and cyclic hydrocarbon radicals having 5 to 20 carbon atoms, and
   c. nickel phosphonate represented by the formula

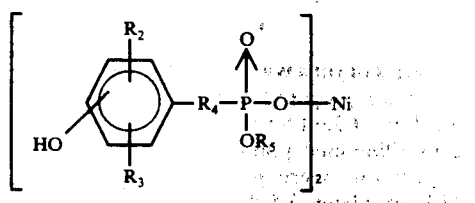

wherein $R_2$ is an alkyl radical having from 1 to 6 carbon atoms, $R_3$ is selected from the group consisting of hydrogen and alkyl having from 1 to 6 carbon atoms, $R_4$ is an alkylene radical having from 1 to 4 carbon atoms and $R_5$ is selected from the group consisting of hydrogen and alkyl having from 1 to 30 carbon atoms, wherein the weight ratio of said zinc oxide to said compound (b) is in the approximate range of 10:1 to 1:3.2 and the weight ratio of said zinc oxide to said compound (c) is in the approximate range of 10:1 to 1:2.

2. The composition of claim 1 additionally comprising at least one hindered phenol antioxidant, the weight ratio of said zinc oxide to said antioxidant being in the approximate range of 500:1 to 1:2.

3. The composition of claim 2 wherein the weight ratio of said zinc oxide to said antioxidant is in the approximate range of 80:1 to 2.5:1.

4. The composition of claim 1 wherein said component (b) is zinc dibutyldithiocarbamate, and said component (c) is nickel bis(O-ethyl-3,5-di-t-butyl-4-hydroxybenzylphosphonate).

5. The composition of claim 2 wherein said component (b) is zinc dibutyldithiocarbamate, said component (c) is nickel bis(O-ethyl-3,5-di-t-butyl-4-hydroxybenzyl phosphonate), and said antioxidant is tetrakis[methylene-(3,5-di-t-butyl-4-hydroxyhydrocinnamate)]methane.

6. The composition of claim 2 wherein said component (b) is zinc dibutyldithiocarbamate, said component (c) is nickel bis(O-ethyl-3,5-di-t-butyl-4-hydroxybenzyl phosphonate), and said antioxidant is 1,3,5-trimethyl-2,4,6-tris(3,5-di-t-butyl-4-hydroxybenzyl)benzene.

7. A stabilized polymeric composition comprising a major amount of a polymer of a mono-1-olefin having incorporated therein
   a. a small but effective amount, sufficient to stabilize said composition against the deteriorative action of ultraviolet light, of zinc oxide;
   b. a small but effective amount, sufficient to stabilize said composition against the deteriorative action of ultraviolet light, of at least one zinc dihydrocarbyldithiocarbamate represented by the formula

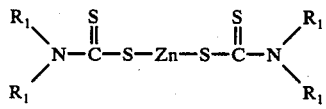

wherein each $R_1$ group is independently selected from the group consisting of acyclic hydrocarbon radicals having from 1 to 20 carbon atoms and cyclic hydrocarbon radicals having from 5 to 20 carbon atoms; and
   c. a small but effective amount, sufficient to stabilize said composition against the deteriorative action of ultraviolet light, of at least one nickel phosphonate represented by the formula $$\left[ \begin{array}{c} R_2 \\ \phantom{x} \\ HO\phantom{xx}\phantom{xx}R_3 \end{array} \phantom{x} R_4 - \overset{O}{\underset{OR_5}{P}} - O \right]_2 Ni$$

wherein $R_2$ is an alkyl radical having from 1 to 6 carbon atoms, $R_3$ is selected from the group consisting of hydrogen and alkyl having from 1 to 6 carbon atoms, $R_4$ is a divalent alkylene radical having from 1 to 4 carbon atoms and $R_5$ is selected from the group consisting of hydrogen and alkyl having from 1 to 30 carbon atoms, and wherein the weight ratio of said zinc oxide to said compound (b) is in the approximate range of 10:1 to 1:3.2 and the weight ratio of said zinc oxide to said compound (c) is in the approximate range of 10:1 to 1:2.

8. The composition of claim 7 additionally having incorporated therein a small but effective amount, sufficient to stabilize said composition against oxidative deteriorative action, of at least one hindered phenol antioxidant.

9. The composition of claim 8 wherein
   said component (a) is present in an approximate amount ranging from 0.25 to 10 php;
   said component (b) is present in an approximate amount ranging from 0.05 to 2 php;
   said component (c) is present in an approximate amount ranging from 0.05 to 1.5 php; and
   said antioxidant is present in an approximate amount ranging from 0.02 to 0.5 php.

10. The composition of claim 8 wherein
    said polymer is a polymer of propylene;
    said component (b) is zinc dibutyldithiocarbamate;
    said component (c) is nickel bis(0-ethyl-3,5-di-t-butyl-4hydroxybenzyl phosphonate); and
    said antioxidant is tetrakis[methylene-(3,5-di-t-butyl-4-hydroxyhydrocinnamate)]methane.

11. The composition of claim 8 wherein
    said polymer is a polymer of propylene;
    said component (b) is zinc dibutyldithiocarbamate;
    said component (c) is nickel bis(O-ethyl-3,5-di-t-butyl-4-hydroxybenzyl phosphonate); and
    said antioxidant is 1,3,5-trimethyl-2,4,6-tris(3,5-di-t-butyl-4-hydroxybenzyl)benzene.

12. The composition of claim 8 wherein
    said component (a) is present in an approximate amount ranging from 0.5 to 4 php;
    said component (b) is present in an approximate amount ranging from 0.1 to 1.6 php;
    said component (c) is present in an approximate amount ranging from 0.08 to 1 php; and
    said antioxidant is present in an approximate amount ranging from 0.05 to 0.2 php.

* * * * *